United States Patent [19]

Kruesi

[11] 4,144,056

[45] Mar. 13, 1979

[54] PROCESS FOR RECOVERING NICKEL, COBALT AND MANGANESE FROM THEIR OXIDE AND SILICATE ORES

[75] Inventor: Paul R. Kruesi, Golden, Colo.

[73] Assignee: Cato Research Corp., Wheatridge, Colo.

[21] Appl. No.: 902,869

[22] Filed: May 4, 1978

[51] Int. Cl.$^2$ .................... C22B 23/00; C22B 47/00
[52] U.S. Cl. .................................. 75/111; 75/80; 75/82; 75/104; 75/113; 75/114; 75/119; 75/121; 423/49; 423/150
[58] Field of Search ............... 75/101 R, 21, 104, 80, 75/114, 82, 109, 111, 119, 113, 121; 423/49, 150; 204/105 M

[56] References Cited

U.S. PATENT DOCUMENTS

| | | | |
|---|---|---|---|
| 3,258,331 | 6/1966 | Jones | 75/80 X |
| 3,661,564 | 5/1972 | Gandon et al. | 75/104 X |
| 3,876,415 | 4/1975 | Bell et al. | 75/82 X |
| 3,894,927 | 7/1975 | Kane et al. | 75/111 X |
| 3,903,236 | 9/1975 | McCutcheon et al. | 75/104 X |
| 3,992,507 | 11/1976 | Cardwell et al. | 75/80 X |

*Primary Examiner*—G. Ozaki
*Attorney, Agent, or Firm*—Sheridan, Ross, Fields & McIntosh

[57] ABSTRACT

A process for recovering the metals manganese, nickel, and cobalt from their oxides and silicates in which the metal oxide or silicate is heated with ferric chloride in the absence of air and in the presence of a volatility depressant salt which is preferably an alkaline metal chloride or ammonium chloride to form the soluble chloride of the metal followed by dissolving the metal chloride from the residue and recovering the metal from the chloride solution by electrolysis, cementation or other standard recovery procedure.

17 Claims, No Drawings

PROCESS FOR RECOVERING NICKEL, COBALT AND MANGANESE FROM THEIR OXIDE AND SILICATE ORES

BACKGROUND OF THE INVENTION

1. Field of the invention

The invention lies in the field of recovering the metals manganese, nickel and cobalt from the oxide and silicate ores by hydrometallurgical procedures.

2. Description of the Prior Art

A great many processes have been developed for the recovery of nickel and cobalt from the extensive, known laterite deposits. While practiced commercially, these processes are all expensive. This expense reflects the high cost of processing and recovering nickel and cobalt where their content in the feed material may be only 1-2 percent nickel and 0.05-0.2 percent cobalt. One of the major problems to be overcome is that the deposits contain large amounts of iron oxides such as goethite. The iron is difficult to isolate chemically and still achieve a high recovery of the small amounts of contained nickel and cobalt. Similarly, sea nodules have been found in quantity in ocean beds. These nodules again contain small amounts of nickel and cobalt with substantial amounts of manganese and iron oxide. The high cost of extracting the nickel and cobalt from such a source, where the content is less than two percent, has been one of the factors which has prevented the exploitation of recovery of those metals from sea nodules.

Among the processes which have been proposed for recovering metal values from lateritic nickel has been the selective reduction of nickel and cobalt to metallic state without co-reducing iron. It has been known to add certain chlorides such as sodium chloride and calcium chloride to promote the reduction. Subsequently the nickel and cobalt can be redissolved with lixiviants which are specific to these metals, as opposed to iron oxide.

A number of processes have been proposed for recovering metal values from sea nodules including the total dissolution of the metal values including iron oxide in strong hydrochloric acid. The reaction of manganese dioxide and hydrochloric acid yields the pollutant chlorine as a product. Further, the process is very expensive and difficult.

SUMMARY OF THE INVENTION

A process for recovering the metals manganese, nickel, and cobalt from their oxides and silicates in which the metal oxide is heated with ferric chloride in the absence of air and in the presence of a volatility depressant salt which is preferably an alkaline metal chloride or ammonium chloride to form the soluble chloride of the metal followed by dissolving the metal chloride from the residue and recovering the metal from the chloride solution by electrolysis, cementation or other standard recovery procedure. A preferred temperature for heating the reaction mixture of ferric chloride, volatility depressant and the oxide or silicate ore is between 200°-450° C. with a maximum upper limit being 600° C. The preferred volatility depressant salts are sodium chloride and ammonium chloride. Ammonium chloride can be recovered from the residue for reuse by volatilization. A further modification of the process is agglomerating the reaction mixture to form pellets which can be heated in a rotary kiln, for example, to effect the reaction.

DESCRIPTION OF THE PREFERRED EMBODIMENTS

The material from which the nickel, cobalt or manganese is to be recovered is dried to remove water. It is then blended with sufficient ferric chloride and a volatility depressant salt, such as ammonium chloride or sodium chloride, to react with the desired metals (nickel, cobalt, or manganese), and the mass is brought to reaction temperature of 200° C. to 400° C. in a reaction from which air is excluded. Following the reaction, excess reagent can be volatilized away by raising the temperature of the reactor. The reaction mass may be cooled and water leached to recover the desired values as water soluble chlorides. A number of processes are well known for converting the water soluble chlorides into valuable products.

The feed material need not be absolutely dry as a small amount of water will be absorbed by the ferric chloride as water of hydration and subsequently volatilized as the reaction mass is heated. Indeed, in one embodiment of the invention, the feed is allowed to be slightly moist so that it will agglomerate with the added salts and form pellets which upon subsequent drying have sufficient strength to traverse a rotary kiln. This is a particularly advantageous method in that the reaction can then be carried out in a continuous, high production manner. Prior to heating, the ferric chloride must be protected from the atmosphere as it is extremely hygroscopic and will absorb moisture from the air.

As is known, ferric chloride has a substantial vapor pressure at about the temperature at which it melts, that is, about 315° C. To prevent the premature volatilization of the ferric chloride, it is desirable to use with it a salt which forms compounds with the ferric chlroide and limits its volatility. Examples of such compounds are ammonium chloride and the alkali metal chlorides, such as sodium chloride and potassium chloride.

Ammonium chloride is particularly attractive in this regard because it is also, by itself, volatile at low temperature, subliming at 355° C. In combination with ferric chloride this temperature is higher, something in excess of 400° C. One can then by using ammonium chloride attain the benefits during the reaction, and then by a modest increase in temperature cause it to sublime for recovery and reuse.

In the case of laterites the nickel is present both as nickel oxide itself and as nickel oxide in silicates and nickel is being extracted from both.

The reactions occurring appear to be as follows:
$3NiO + 2FeCl_3 \rightarrow 3NiCl_2 + Fe_2O_3$
$3CoO + 2FeCl_3 \rightarrow 3CoCl_2 + Fe_2O_3$
$Mn_2O_3 + 2FeCl_3 \rightarrow 2MnCl_2 + Fe_2O_3 + Cl_2$
$3MnO_2 + 4FeCl_3 \rightarrow 3MnCl_2 + 2Fe_2O_3 + 3Cl_2$ The chlorine that can be generated when manganese dioxide is present, as in the case of sea nodules, is partly reacted with alkaline earth oxides which are present, releasing oxygen. If in excess, the chlorine is readily used to produce additional ferric chloride in a separate reactor.

The reaction is favored over a considerable temperature range. A minimum of 200° C. should be used. A temperature of 400° C. is most favored. At temperatures above 400° C. ammonium chloride-ferric chlroide mixture becomes volatile. This does not prevent the reaction occurring, however. Temperatures above 600° C.

are undesirable in that the yield of manganese will be less, and in that heat is being wasted.

If desired, a liquid bath of, for example, sodium chloride-ferric chloride can be used and the solid feed reacted with this bath. The essential requirement is that at the reaction temperature ferric chloride comes into contact with the desired metal oxide or silicate to effect the exchange reaction.

Most lateritic ores are fine grained or readily reduced to fine grained materials. Sea nodules, on the other hand, are coarse and need to be ground prior to reaction. Grinding the sea nodules to minus 30 mesh is sufficient for high recovery.

The invention is illustrated by the following examples which are in no way limiting thereof.

EXAMPLE 1

Fifty grams of a highly ferruginous (45 percent Fe) low grade (0.6 percent Ni) nickel laterite was blended with 340 grams of ferric chloride and 60 grams of ammonium chloride. The reaction mass was heated to 300° C. and held at this temperature for thirty minutes. The cooled mass was leached with water and 82 percent of the contained nickel was found to be water soluble.

EXAMPLE 2

One hundred grams of the same laterite as used in Example 1 was blended with 100 grams of ferric chloride and 20 grams of ammonium chloride. The reaction mass was heated to 400° C. and held at this temperature for one hour. The cooled mass was leached with water and 91 percent of the nickel in the sample was found to be water soluble.

EXAMPLE 3

Fifty grams of sea nodules taken from the Pacific Ocean were ground to minus 30 mesh and injected into a bath of 274 grams ferric chloride and 126 grams of sodium chloride at a temperature of 420° C. The sea nodules contained 22.4 percent manganese, 1.04 percent of nickel, 0.8 percent copper, and 0.14 percent cobalt. The reaction was carried out for one hour. After cooling the material was water leached and 98 percent of the manganese, 99 percent of the cobalt, 98 percent of the nickel, and 97 percent of the copper from the original sample were found to be water soluble.

EXAMPLE 4

Fifty grams of the sea nodules described in Example 3 were ground to minus 35 mesh and reacted with 50 grams of ferric chloride and 10 grams of ammonium chloride at a temperature of 400° C. for one hour. After reaction, the soluble chlorides were dissolved in water and 86 percent of the manganese, 82 percent of the copper, 91 percent of the cobalt and 88 percent of the nickel from the original sample were found to be water soluble.

What is claimed is:

1. A process for the recovery of a metal selected from the group consisting of manganese, nickel and cobalt from its oxide or silicate which comprises:
    (a) heating the oxide or silicate with ferric chloride in the absence of air in the presence of a volatility depressant salt selected from the group consisting of an alkali metal chloride and ammonium chloride to form the soluble metal chloride, and
    (b) recovering the metal from its formed soluble chloride.

2. The process of claim 1 in which in step (a) a temperature of about 200°-600° C. is used.

3. The process of claim 2 in which a temperature of about 200°-450° C. is used.

4. The process of claim 1 in which said salt is ammonium chloride.

5. The process of claim 4 in which in step (a) a temperature of about 200°-400° C. is used.

6. The process of claim 1 in which said salt is sodium chloride.

7. The process of claim 6 in which in step (a) a temperature of about 200°-420° C. is used.

8. The process of claim 7 in which the mixture of ferric chloride and sodium chloride is in the form of a fused salt liquid bath.

9. The process of claim 1 in which the oxides are in a mixture with gangue material.

10. The process of claim 9 in which said mixture is dried before the metal oxides are reacted with ferric chloride.

11. The process of claim 9 in which the mixture contains water.

12. The process of claim 11 in which the mixture is agglomerated with the salt into pellets before being heated to effect reaction of the reactants, whereby the heating can be performed in a rotary or other type kiln.

13. The process of claim 9 in which the mixture is fine ground before treatment with ferric chloride.

14. The process of claim 1 in which the formed soluble chloride is dissolved in water and the metals recovered from the water solution of the chlorides.

15. The process of claim 14 in which reagents used in the process are recovered by volatilizing the residue after the soluble chloride has been removed.

16. The process of claim 1 in which said metal is recovered from its oxide.

17. The process of claim 1 in which said metal is recovered from its silicate.

* * * * *